May 15, 1945.   H. B. JOHNSTON   2,376,148
PISTON AND PISTON RING
Filed April 29, 1942   2 Sheets-Sheet 1

Inventor
Harry B. Johnston
By Walter W. Burns
Attorney

May 15, 1945.   H. B. JOHNSTON   2,376,148
PISTON AND PISTON RING
Filed April 29, 1942   2 Sheets-Sheet 2

Inventor

Harry B. Johnston

By Walter W. Burns
Attorney

Patented May 15, 1945

2,376,148

UNITED STATES PATENT OFFICE 2,376,148

PISTON AND PISTON RING

Harry B. Johnston, Baldwin Park, Calif.

Application April 29, 1942, Serial No. 440,996

5 Claims. (Cl. 309—25)

This invention relates to pistons and piston rings and has particular relation to a piston ring which is expanded primarily by the fluid pressure at the end of the cylinder.

In internal combustion motors and particularly in those of the Diesel type, it is very important that the rings not only hold tightly to restrain the gases from passing the piston but upon release of the pressure at the end of a stroke, to have the piston ring release its pressure and yet remain free in its groove and ready for instant action when the pressure is again applied.

The primary object of this invention is the provision of an improved piston ring for a rectangular groove which will expand against the cylinder wall in direct proportion to the fluid pressure at the piston head.

Another object of the invention is the provision of a piston ring having coacting circular sections, one of which in operation presses against the inner or back wall of the groove while another ring section presses against the cylinder wall—thus sealing the cylinder against passage of the fluid.

A further object of the invention is the provision of a piston ring having a plurality of coacting circular sections, one section operating to seal the cylinder wall and piston against the passage of fluid in one direction and the other operating against the cylinder to prevent passage of fluid in the other direction and third circular section functioning to prevent the passage of fluid at the back of the ring, regardless of direction of movement.

A still further object of the invention is the provision of a piston ring having a plurality of circular sections, one of the sections contacting with the back cylindrical surface of a groove and having two oppositely disposed conical surfaces, there being two other ring sections, each in coactive contact with one of the oppositely disposed conical surfaces of the first named ring section.

Another and still further object of the invention is the provision of a ring and groove construction wherein some part of the ring, when in operation, will press on the cylinder wall, the inner or back wall of the groove and one side of the groove at the same time.

Another and still further object of the invention is the provision of a ring and groove construction wherein the ring is made of a plurality of resilient ring sections, one of the sections being resiliently held against the back or inner wall of the groove, one of the ring sections being resiliently held against the cylinder wall and another section in engagement with a side wall of the groove, the sections being relatively constructed and arranged so that when pressure is applied at the end of the cylinder, the ring sections will simultaneously press against the back wall of the groove, one side wall thereof and the cylinder wall.

Other and further objects of the invention will be apparent to those skilled in the art from a reading of the complete specification.

Referring to the drawings which illustrate my invention,

In the specification and drawings the same designations refer to the same or similar parts, throughout the disclosure.

Figure 1:
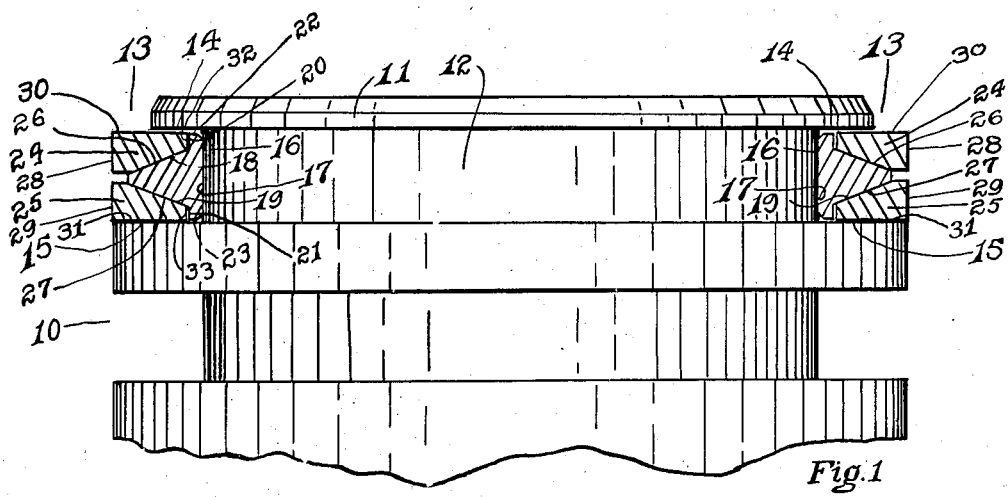
Fig. 1 is a cross section of my invention applied to a piston having a rectangular groove; as for example, that of an internal combustion motor, it being understood that the proportions of the ring and sections relative to the piston and a cylinder shown, are enlarged for the sake of clearness.
Figure 2:
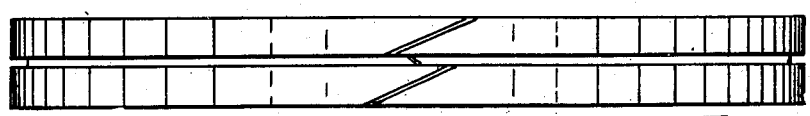
Fig. 2 is a side view of the ring structure shown in Fig. 1.
Figure 3:
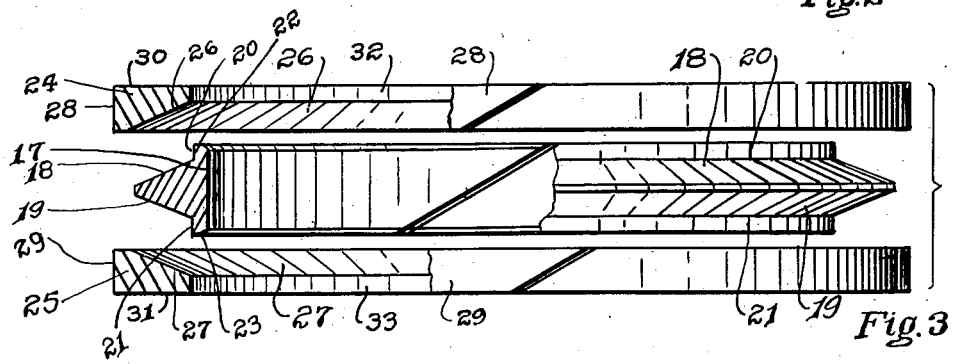
Fig. 3 is a group view of the ring sections, showing them separated to illustrate their construction, the upper and lower rings being broken away to show the construction of the inner side.

Referring particularly to Fig. 1, 11 designates the head of a piston. In the side of the piston adjacent the head 11 is a substantially rectangular groove 12 with a cutaway portion 13 in the head 11 between the groove and the head of the piston. The back of the rectangular groove 12 is illustrated as having, though not necessarily, a cylindrical wall while the sides 14 and 15 are substantially in planes.

Within the substantially rectangular groove is a rectangular ring.

The ring is made up of a plurality of sections—three in the embodiment illustrated in Fig. 1.

The inner section 16 of the ring has an inner surface 17 which conforms to the back wall 12 of the groove and is in normal close proximity to the wall 12 and may if having a single split, have a slightly inward spring tension.

Outwardly of the surface 17 on the ring section 16 are two conical or inclined surfaces 18, 19 which are oppositely disposed and which incline outwardly toward each other and away from the nearest or adjacent end of the piston. These two conical or inclined surfaces as illustrated come substantially together at a circle of substantially the diameter of the piston, leaving a slight space where oil may collect for lubrication.

At the inner edges of the conical surfaces 18, 19 are shoulders which, as shown, are short cylindrical surfaces 20 and 21 respectively. These short cylindrical surfaces extend from the conical or inclined walls 18 or 19 to the outer axial ends 22, 23 of the ring section 16. These ends 22, 23 are preferably annular plane surfaces extending from the cylindrical surfaces 20, 21 to the inner surface 17 of the ring section 16, the edges between the three surfaces 22, 17, 23 being cut away in order that the ring as a whole may fit a rectangular groove, the walls of which may have had considerable wear except at the corners of the groove.

Ring sections 24 and 25 have respective conical or inclined surfaces 26, 27 which coact with surfaces 18, 19 of the inner ring section 16.

These ring sections 24, 25 have outer cylindrical surfaces 28, 29 which engage the cylinder wall. They also have flat faces 30, 31 which form the outer flat surfaces of the ring as a whole. The distance between the surfaces 30 and 31 is slightly greater than the axial thickness of the inner ring section 16. The purpose of this construction is to permit the face 31 to seat on the wall 15 of the groove and the face 30 to seat on the wall 14 of the groove during operation, while still permitting full seating between the surfaces 18 and 26, 19 and 27 respectively. At the inner edge of the ring sections 24, 25 are short cylindrical surfaces 32, 33 which are opposite the surfaces 20 and 21, respectively, of the inner ring section 16.

During the operation of the ring, the pressure at the end of the cylinder head 11, passes through the cutaway annular space 13 and presses against the face 30 of the ring section 24. Due to the construction of, and the contact between, the surfaces, 18, 26 and 19, 27 and their cooperation, the ring section 16 will be held tightly against the groove wall 12, while the face 31 will be held against the groove wall 15 and the two ring sections 24, 25 will be forced against the wall of the cylinder 10.

By these cooperating ring sections and the groove walls, a tight seal is maintained to prevent the fluid from passing between the side wall of the piston and the cylinder wall. The prevention of the passage of the fluid allows the oil film on the cylinder wall to remain intact.

Upon reversal of the direction of pressure, the operation will be the same except that the surface 30 will contact and coact with the surface 14 and there may be a slight space between the wall 15 and the ring section face 31.

Figures 4, 5, 6:
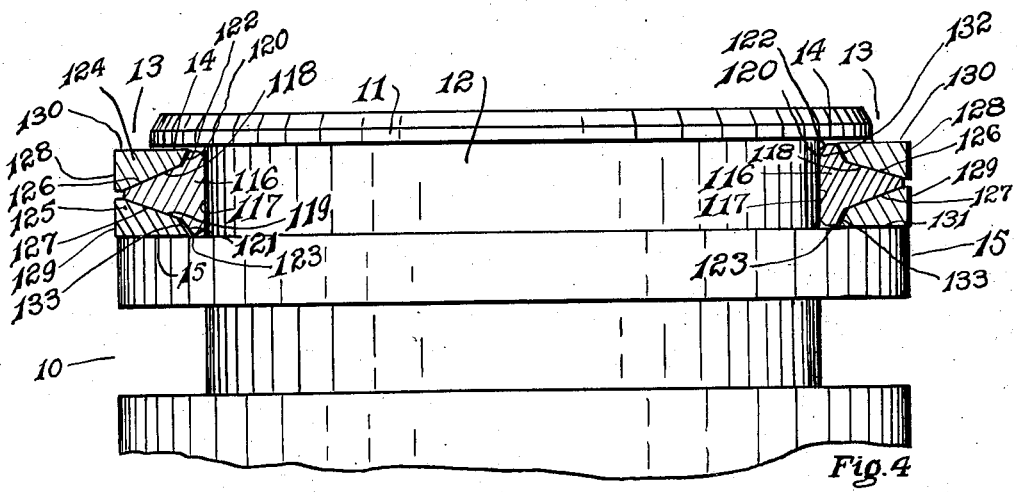
Fig. 4 is a view similar to Fig. 1 but of another form of the invention.
Figs. 5 and 6 are similar to Figs. 2 and 3 but of the modification illustrated in Fig. 4.

In Figs. 4, 5, 6, the piston head 11 and the groove with its walls 12, 13 and 14 are the same in construction and operation as the construction illustrated in Fig. 1.

Also in Figs. 4, 5 and 6, the parts 117, 118, 119, 120, 121, 122, 123, 124, 125, 126, 127, 128, 129, 130, 131, 132 and 133 correspond to their counterparts 17 to 33 respectively except that outward movement of the ring sections 124, 125 may have smaller gaps between the surfaces 120, 132 and 121, 133 than those between 20, 32 and 21, 31, other parts of the construction being the same.

While this invention has been illustrated and described in detail, it is understood that the disclosure is merely illustrative and that modifications and changes may be made without departing from the spirit of the invention and within its scope as claimed.

Having described my invention, what I claim is:

1. A piston having a groove with a cylindrical wall at the back of the groove and coaxial with the piston and being cut away between the piston end and the adjacent wall of the groove and a ring in the groove, the ring having a plurality of circular ring sections, one section being of a sufficiently less axial thickness than the width of the groove to provide for movement during operation and having a cylindrical surface in coactive relation with the cylindrical wall of the groove and having two oppositely disposed conical surfaces extending outwardly and away from the adjacent respective cylinder ends, and two other ring sections each having a cylinder contacting surface and a conical surface in coactive relationship with one of the conical surfaces of the first named section the radial thickness of the ring being so related to the depth of its groove that all ring sections may be compressed to a size not greater than the diameter of the piston.

2. A piston having a groove with a cylindrical wall at the back thereof and coaxial with the piston and being cut away between the piston end and the adjacent wall of the groove and a ring in the groove, the ring having opposite surfaces substantially in planes and having circular sections, one of the sections being of a sufficiently less axial thickness than the width of the groove to provide for movement during operation and having an inner cylindrical surface extending substantially from top to bottom of the groove and coacting with the cylindrical wall of the groove and having two oppositely disposed conical surfaces extending outwardly and away from the respective adjacent ends of the piston, two other sections, each having a cylinder contacting surface and a conical surface in coactive contact with a conical surface of the first section the radial thickness of the ring being so related to the depth of its groove that all ring sections may be compressed to a size not greater than the diameter of the piston.

3. A piston having a groove with a cylindrical wall at the back thereof and two side walls, and being cut away between the piston end and the adjacent wall of the groove, a ring in the groove, the ring having circular sections, one inner section being of a sufficiently less axial thickness than the width of the groove to provide for movement during operation and having two oppositely disposed conical surfaces on its outer portion and having on its inner side a surface of similar shape to the back wall of the groove and having a resilience to hold its coacting surface in normal contact therewith, the ring having two outer sections each having a conical surface in contact with a conical surface of the inner section and each having also a cylindrical surface for contact with the cylinder wall the radial thickness of the ring being so related to the depth of its groove that all ring sections may be compressed to a size not greater than the diameter of the piston.

4. A piston having a rectangular groove, and being cut away between the piston end and the adjacent wall of the groove, and a ring for the groove, the ring comprising a plurality of circular sections, one of the sections having a thickness less than the width of the groove and having a concave cylindrical surface in contact with the bottom of the groove and a conical surface extending outwardly and away from the pressure end of the cylinder and having its inner periphery ending outwardly of its concave cylindrical surface and a second ring section having a convex cylindrical surface for coactive contact with the cylinder wall and a conical surface coacting with the conical surface of the first named ring section.

5. A piston having a rectangular groove and a ring in the groove, and being cut away between the piston end and the adjacent wall of the groove, the ring comprising a plurality of circular sections, one of the sections having a thickness less than the axial width of the groove and having a concave cylindrical surface in contact with the back wall of the groove and having two oppositely disposed conical surfaces extending outwardly and away from their adjacent piston ends and extending between substantially the outer perimeter of the section to a line adjacent the inner cylindrical surface, two other ring sections each having a cylinder-contacting surface and each having a conical surface in coactive relation with one of the respective oppositely disposed conical surfaces of the first mentioned ring.

HARRY B. JOHNSTON.